United States Patent [19]

Shimomura

[11] Patent Number: 4,627,683

[45] Date of Patent: Dec. 9, 1986

[54] ELECTRICAL OUTLET

[75] Inventor: Kiyosji Shimomura, Tokyo, Japan

[73] Assignee: Rainbow Trading Co., Inc., New York, N.Y.

[21] Appl. No.: 638,662

[22] Filed: Aug. 7, 1984

[51] Int. Cl.$^4$ .............................................. H02B 1/04
[52] U.S. Cl. .................................... 339/128; 248/27.3
[58] Field of Search ............ 339/128, 126 R, 126 RS; 248/27.3; 220/3.5, 3.6; 174/54, 55, 56

[56] References Cited

U.S. PATENT DOCUMENTS 3,596,233  7/1971  DeVito ................................ 339/128
4,080,522  3/1978  Schimmels ...................... 339/128 X

FOREIGN PATENT DOCUMENTS 2430707  1/1976  Fed. Rep. of Germany ...... 339/128

OTHER PUBLICATIONS

"Self-Retaining Lamp Assembly", DiBernardo, IBM Tech. Discl. Bull., vol. 7, No. 1, 6-1964.

Primary Examiner—Eugene F. Desmond
Attorney, Agent, or Firm—Stephen E. Feldman

[57] ABSTRACT

An electrical outlet arranged to be positioned in a cut out in a furniture panel or the like. The body of the outlet is fabricated of a resilient, flexible material and has two generally planar, parallel spaced apart surfaces. Each of these surfaces contains a plurality of sawtoothed shaped detents arranged to engage corresponding surfaces about the cutout. In a first direction, the insertion direction, the detents cause the surfaces to deflect to permit insertion but attempted withdrawal causes engagement of the detents with the cut out surfaces to prevent withdrawal. The remaining surfaces of the outlet body are curved to prevent rotation of the outlet and to facilitate deflection and recovery of the outlet body. One or more sets of receptacle terminals with electrical conductors and electrical plugs coupled thereto are molded into the outlet to provide a unitary structure.

8 Claims, 5 Drawing Figures

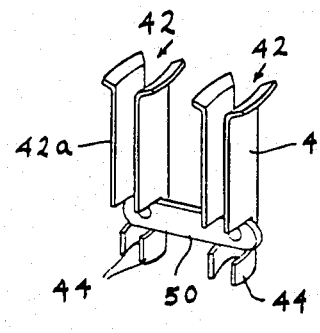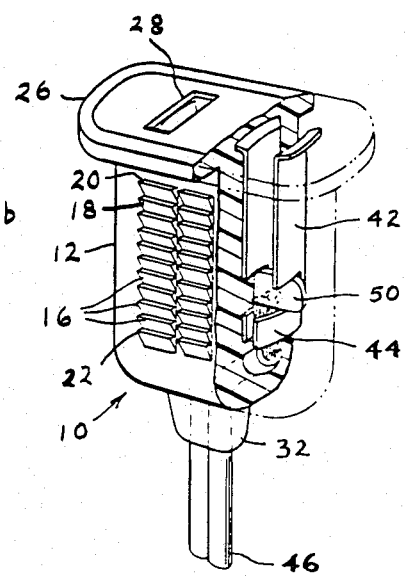
FIG.3B  FIG.3A
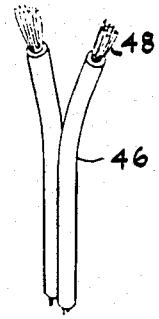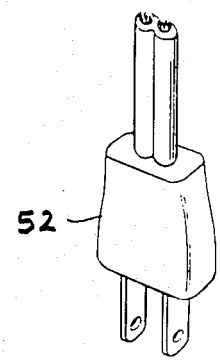

ELECTRICAL OUTLET

BACKGROUND OF THE INVENTION

1. Field of the Invention

With the extensive use of electrical appliances and equipment in the home, office, store, workshop, etc., it is desireable to have ready access to sufficient electrical outlets. It is often not sufficient to have outlets in the floor, walls, or power poles adjacent the desk, table, furniture, work bench, counter, etc. It is desireable to provide electrical outlets directly on such furniture or in panels adjacent to such panels such as the dividers between adjacent offices or work stations.

2. Description of the Prior Art

According to presently employed techniques one or more electrical outlets are mounted to the surface of a furniture or wall panel. Firstly, a utility box must be fastened to the furniture or wall panel with suitable fasteners. A hole must be drilled through the panel to provide access to an electrical power outlet. A knock out in the box must be removed and a plastic throat or strain relief placed in the box knock out to protect the electrical conductors entering the utility box from damage to the insulation which could be caused by the sharp edges of the utility box knock out. The receptacle units to be placed in the box are next connected to the electrical conductors, then the receptacle units are screwed to the utility box. Finally an appropriate face plate is screwed over the utility box and the outlets can now be tested. This operation is generally performed by a licensed electrician at great cost. Also the overall system can not be tested until the utility box has been assembled and wired.

SUMMARY OF THE INVENTION

The instant invention overcomes the above identified difficulties noted with respect to the prior art by providing a unitary electrical outlet structure which can be integrally formed at the factory and 100% tested and which can be installed by a person having no technical skill and requiring no tools to install the electrical outlet structure in premade cut outs in furniture or wall panels or the like.

An electrical outlet is formed of a body fabricated from a resilient, flexible material and has two generally planar, parallel spaced apart surfaces. Each of these surfaces contains a plurality of saw-toothed shaped detents arranged to engage corresponding surfaces about the cut out. In the insertion direction, the engagement of the detents with the cut out surfaces cause the surfaces of the outlet to deflect, facilitating insertion. However, when insertion is completed the outlet walls tend to return to their initial positions. Any attempted withdrawal of the outlet causes the detents to engage their associated cut out walls preventing withdrawal of the outlet. The planar walls are joined by two curved walls which assist in the flexure and return of the planar surfaces. The generally rectangular shaped profile prevents rotation of the outlet in the cutout which could possibly disengage the detents from the cut out walls. One or more sets of a receptacle terminals with electrical conductors and electrical plugs coupled thereto are molded into the outlet to provide a unitary structure. It is therefore an object of the invention to provide a unitary, preassembled electrical outlet for furniture or wall panels or the like.

It is another object of the invention to provide a unitary preassembled electrical outlet for mounting within a cut out in a furniture or wall panel or the like.

It is another object of the invention to provide a unitary preassembled electrical outlet for mounting within a cut out in a furniture or wall panel or the like by means of detents formed on said electrical outlet.

It is still another object of the invention to provide an electrical outlet formed of resilient material and having deflectable walls and detents by which the outlet can be easily placed in a cut out but which prevent removal of such outlet from such cut out.

Other objects and features of the invention will be pointed out in the following descriptions and claims and illustrated in the accompanying drawings, which disclose, by way of example, the principles of the invention, and the best modes which have been contemplated for carrying them out.

BRIEF DESCRIPTION OF THE DRAWINGS

In the drawings in which similar elements are given similar reference characters.

FIGS. 3a, 3b and 3c oblique, exploded views of the receptacle terminals and electrical conductors of FIG. 2.

DESCRIPTION OF THE PREFERRED EMBODIMENTS

Figure 1:
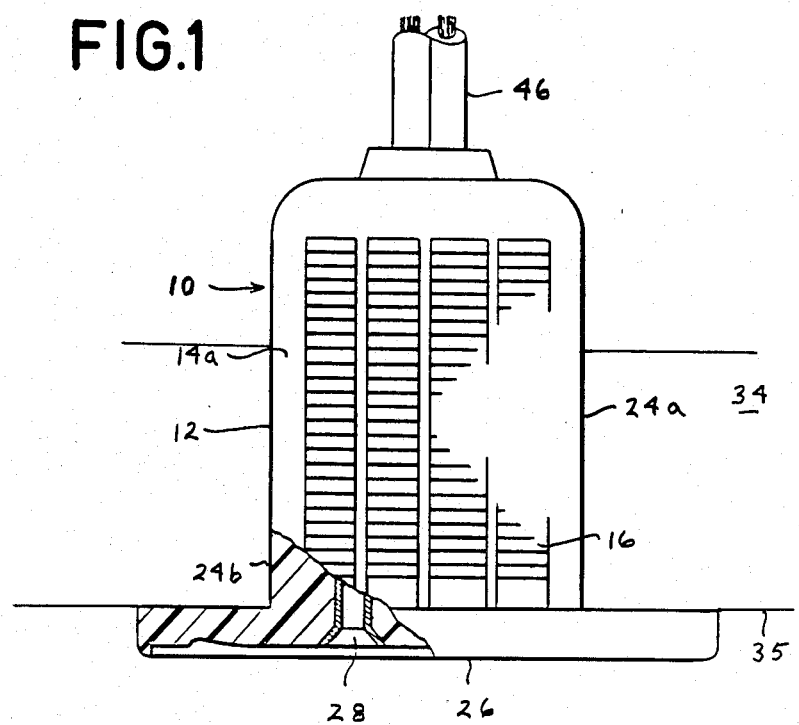
FIG. 1 is an oblique view of an electrical outlet constructed in accordance with the concepts of the invention together with a suitable aperture in a furniture panel arranged to receive said electrical outlet.
Figure 2:
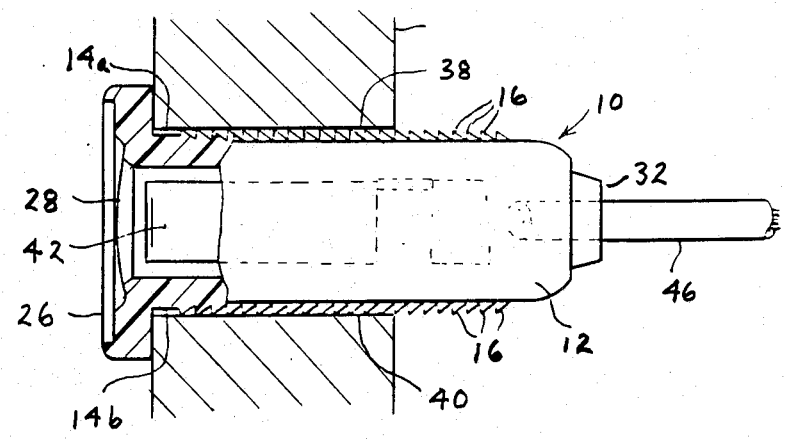
FIG. 2 is an oblique view of the electrical outlet, partially cut away and partially in section showing the placement of the receptacle terminals and conductors therein.

Turning now to FIGS. 1, 2 and 3 there is shown an electrical outlet 10 constructed in accordance with the concepts of the invention. Electrical outlet 10 has a body portion 12 constructed of a suitable moldable, flexible and resilient material such as rubber or thermoplastic. Body portion 12 has a pair of generally planar, parallel, spaced apart surfaces 14a and 14b. Arranged along surfaces 14a and 14b are a plurality of saw-toothed shaped detents 16. Each saw-tooth shaped detent 16 has an inclined leading face 18 and a perpendicular trailing face 20 and a sharp edge transition 22 therebetween. Two curved surfaces 24a and 24b join with surfaces 14a and 14b to form a closed profile. A face plate 26 is formed perpendicular to body portion 12 and has a profile larger than the remainder of body 12 for the reasons set forth below. Two entry slots 28 are formed in face plate 26. The opposite end body portion 12 is gently tapered as at 30 to provide for ease in inserting outlet 10 into a receiving aperature. A strain relief 32 completes the electrical outlet 10.

An aperture 36 in furniture panel 34 is prepared to receive electrical outlet 10. Top and bottom surfaces 38 and 40 which partially define aperture 36, are planar and parallel to one another and spaced by a distance somewhat less than the effective height of the electrical outlet 10 measured from edge 22 of the detents 16 on surface 14a to the edge 22 of the detents 16 on surface 14b. As a result, the engagement of the leading faces 18 of the detents 16 with surfaces 38 and 40 cause surfaces 14a and 14b and the detents 16 to flex and slightly compress the body portion 12. The surfaces 14a and 14b move closer together and the two curved surfaces 24a and 24b move outwardly. The width of aperture 36 is intentionally made greater than the distance between curved surfaces 24a and 24b to permit such expansion of body portion 12. Once insertion of the electrical outlet 10 into aperture 36 is completed, that is, once face plate 26 engages the front surface 35 of panel 34, the body portion 12 tries to return to its initial position under the influence of plastic memory. Any attempt to withdraw the electrical outlet 10 from the panel 34 in a direction opposite to insertion will cause the edges 22 of the detents 16 to bite into the surfaces 38 and 40 and prevent removal of the electrical outlet 10.

In the embodiment shown a set of receptacle terminals 42 of the type ordinarily used to engage the prongs of an electrical plug are shown (see FIG. 3). Terminals 42 are each made up of a pair of contacts 42a and 42b which receive a plug prong therebetween and which has a crimpable barrel 44 to receive the bared end 48 of an insulated conductor 46. An insulation bridge 50 holds the position of each of the receptacle terminals 42. The opposite ends of the electrical conductors 46 terminate in a plug 52 which can be coupled to a suitable power source.

The electrical outlet 10 body portion 12 is molded about the terminals 42 after conductors 46 have been crimped thereto. This controls the spacing and positions of terminals 42 and provides a strain relief 32 for the conductors 46 to prevent separation of the conductors 46 from the receptacle terminals 42. Slots 28 in face plate 26 are aligned with terminals 42 to receive an electrical plug.

Figure 3C:
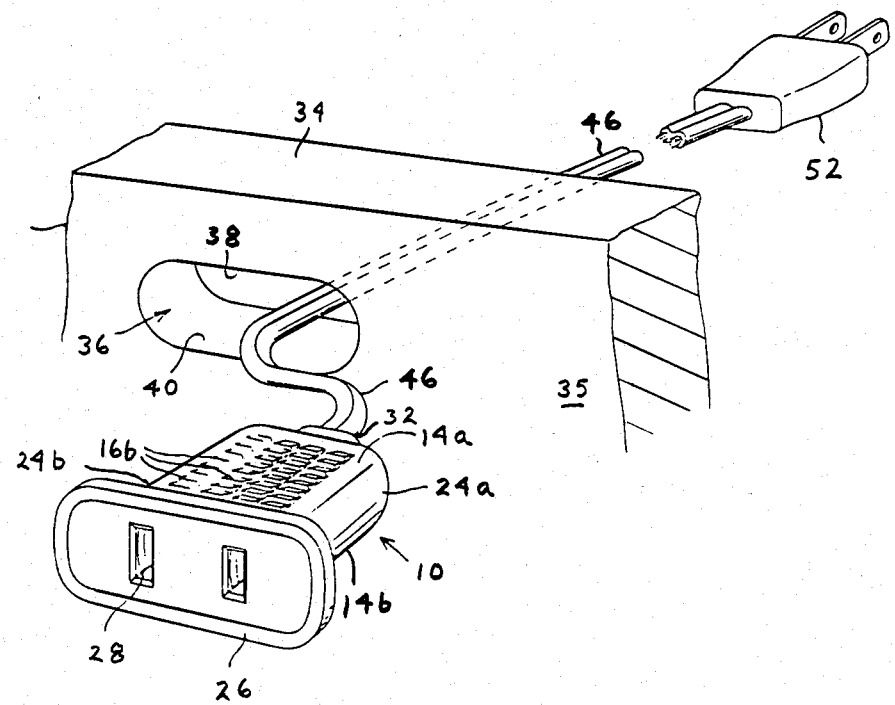

As is shown in FIG. 3c, illustration of the electrical outlet 10 in an aperture 36 is carried out by first passing the electrical plug through aperature 36 followed by conductors 46 and finally the outlet 10 as described above.

Although the drawings show a single set of terminals 42, the body portion 12 can be expanded as desired to accept 2 or 4 or any number of sets of receptacle terminals 42 in combination with switches, indicator lights, etc.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. A self-contained electrical outlet for mounting within a cut out through a furniture panel or the like comprising: a resilient, flexible body portion having at least one axial surface thereon positionable adjacent one planar surface, said planar surface being one of the walls of said cut out; at least one deflectable detent formed on said axial surface, said detent movable between an initial position and a further position; said detent being moved from its initial position towards said further position as said outlet is moved through said cut out in a first direction and said detent engages said one planar surface and said detent moves towards said initial position to engage said one planar surface in such a way that a tip of said detent is in frictional contact with said planar surface, said planar surface being the only surface said detent is in contact with, to prevent withdrawal of said outlet from said cut out when forces are placed on said outlet in a second direction opposite said first direction; at least one set of receptacle terminals mounted in said outlet to mechanically and electrically engage the prongs of an electrical plug and connection means coupled said receptacle terminals and adapted to be coupled to a source of electrical energy.

2. An electrical outlet as defined in claim 1, wherein said axial surface has a plurality of deflectable detents thereon.

3. An electrical outlet as defined in claim 1, wherein said axial surface has plurality of deflectable detents thereon arranged in a plurality of rows and columns.

4. An electrical outlet as defined in claim 1, further comprising a face plate perpendicular to said axial surface to limit insertion of said outlet into said cut out and prevent withdrawal of said outlet from said cutout by forces moving in said first direction.

5. An electrical outlet as defined in claim 1, wherein said outlet body portion is molded about said receptacle terminals and said connection means to form an integral unit.

6. An electrical outlet as defined in claim 1, further comprising additional axial surface generally parallel with said axial surface and spaced apart therefrom and positionable adjacent a second planar surface said surface being one of the walls of said cut out; at least one additional deflectable detent formed on said additional axial surface movable between an initial position and a further position; said additional detent being moved from its initial position towards said further position as said outlet is moved through said cut out in a first direction and said additional detent engages said second planar surface and said additional detent moves towards said initial position to engage said second planar surface to further prevent withdrawal of said outlet from said cutout when forces are placed on said outlet in a second direction opposite said first direction.

7. An electrical outlet as defined in claim 6, wherein said axial surface and said additional axial surface each have a plurality of deflectable detents thereon.

8. An electrical outlet as defined in claim 6, wherein said axial surface and said additional axial surface each have a plurality of deflectable detents thereon arranged in a plurality of rows and columns.

* * * * *